United States Patent [19]
Tanigawa et al.

[11] Patent Number: 5,909,690
[45] Date of Patent: Jun. 1, 1999

[54] APPARATUS AND METHOD FOR PAGE-RETRIEVAL USING ELECTRONIC BOOK DISPLAY

[75] Inventors: Hidekazu Tanigawa, Hirakata; Yoshio Nakano, Takatsuki, both of Japan

[73] Assignee: Matsushita Electric Industrial Co., Ltd., Osaka, Japan

[21] Appl. No.: 08/877,609

[22] Filed: Jun. 17, 1997

Related U.S. Application Data

[62] Division of application No. 08/219,184, Mar. 29, 1994, Pat. No. 5,696,982.

[30] Foreign Application Priority Data

Mar. 31, 1993 [JP] Japan ................................. 5-074254
Mar. 15, 1994 [JP] Japan ................................. 6-043961

[51] Int. Cl.⁶ .............................................. G06F 17/21
[52] U.S. Cl. .................................. 707/526; 345/350
[58] Field of Search ........................... 707/526; 345/350

[56] References Cited

U.S. PATENT DOCUMENTS

| | | | |
|---|---|---|---|
| 5,021,989 | 6/1991 | Fujisawa et al. | 345/350 |
| 5,146,600 | 9/1992 | Sugiura | 707/104 |
| 5,283,864 | 2/1994 | Knowlton | 345/350 |
| 5,392,387 | 2/1995 | Fitzpatrick et al. | 345/350 |
| 5,438,662 | 8/1995 | Randall | 345/350 |
| 5,463,725 | 10/1995 | Henckel et al. | 345/350 |
| 5,673,406 | 9/1997 | Hirayama et al. | 345/350 |

FOREIGN PATENT DOCUMENTS

| | | |
|---|---|---|
| 2181863 | 7/1990 | Japan. |
| 36659 | 1/1991 | Japan. |
| 4181457 | 6/1992 | Japan. |

*Primary Examiner*—Stephen S. Hong
*Attorney, Agent, or Firm*—Price Gess & Ubell

[57] ABSTRACT

An apparatus and method for page-retrieval for use with an electronic display, especially suited for so-called electronic books, wherein a current relative position of a current page of the book and the number of times a page has previously been displayed are graphically displayed. A document image is stored in a document image storage unit and the document image is displayed on a computer screen. A number of display times storage unit stores the number of times each page has been viewed by a user. A relative location image control unit determines the relative location within the book image of a currently displayed page and the electronic book is displayed on the screen showing a visual indication of the relative position of the currently displayed page. The pages of the electronic book are color shaded by a number of display times image generation unit to give a visual indication of the relative number of times each page has been displayed to allow frequently displayed pages to be quickly located by a user. A marker can also be displayed on the screen to indicate pages marked by a user.

2 Claims, 21 Drawing Sheets

Fig. 9

| PAGE No. | DISPLAY-TIMES |
|---|---|
| 1 | 11 |
| 2 | 345 |
| 3 | 45 |
| 4 | 55 |
| 5 | 28 |
| 6 | 19 |
| 7 | 23 |
| 8 | 7 |
| 9 | 146 |
| 10 | 37 |

Fig. 16

| PAGE No. (161) | DISPLAY-TIMES (162) |
|---|---|
| 1 | 20 |
| 2 | 20 |
| 3 | 135 |
| 4 | 135 |
| 5 | 0 |
| 6 | 0 |
| 7 | 15 |
| 8 | 15 |
| 9 | 22 |
| 10 | 22 |
| 11 | 3 |
| 12 | 3 |
| 13 | 21 |
| 14 | 21 |
| 15 | 23 |
| 16 | 23 |
| 17 | 10 |
| 18 | 10 |
| 19 | 0 |
| 20 | 0 |

APPARATUS AND METHOD FOR PAGE-RETRIEVAL USING ELECTRONIC BOOK DISPLAY

This is a division of application Ser. No. 08/219,184, filed on Mar. 29, 1994, now U.S. Pat. No. 5,696,982.

BACKGROUND OF THE INVENTION

1. Field of the Invention

The present invention relates to a document filing system, and more particularly, to an apparatus and method for page-retrieval using an electronic-book display employed in the system.

2. Related Art

Today's document filing systems feature a page-retrieval function which use an electronic-book display, and the page-retrieval function has steadily been improved.

Japanese Laid-open Patent Application No. 2-181864 and U.S. Pat. No. 5,146,600 disclose inventions which take into account the display frequency of the viewed objects. The number of times a key word is displayed or printed is determined. When a relation between the number of display times or the number of prints meets a predetermined condition, the two numbers are displayed on a screen. However, the numbers are referred to only to determine which documents are to be saved or not. Only the numbers are displayed, with no relative indication being given. Thus, the number of display times is not shown collectively for all the retrieved items, nor does the user have a convenient, graphical illustration of the relative frequency of displays. A page retrieval based upon the relative display frequencies for the pages has not yet been developed.

Japanese Laid-open Patent Application No. 1-278170 and U.S. Pat. No. 5,146,600 disclose inventions which take into account the display frequency: the number of display times and that for print-out are counted per page and when a relation between these two numbers meets a predetermined condition, such a description is displayed. However, the description is referred only to determine which documents are to be saved and which are not. Thus, the number of display times per page is shown neither collectively nor illustratively for the use of the page-retrieval, and the page-retrieval based on the display frequency has not been realized yet.

SUMMARY OF THE INVENTION

Accordingly, the present invention has as an object to provide an apparatus and method of page-retrieval for indicating an important page to an operator by graphically displaying the relative number of times a page has been displayed.

The present invention has as another object to provide an apparatus and method of page-retrieval for retrieving an important page by referring to the number of display times stored in the apparatus.

The present invention has as another object to provide an apparatus and method of page-retrieval for graphically showing a relative location of each page with a document and the respective number of times each page has been displayed either in an electronic book display or a nonelectronic book display.

The present invention has as another object to provide an apparatus and method of page-retrieval using an electronic-book display for retrieving a frequently displayed page by attaching a mark to the fore-edge of the page in the electronic-book display.

The above objects may be fulfilled by the apparatus and method of the present invention wherein a document image is stored in a document image storage unit and the document image is displayed on a computer screen. A number of display times storage unit stores the number of times each page has been viewed by a user. A relative location image control unit determines the relative location within the book image of a currently displayed page and the electronic book is displayed on the screen showing a visual indication of the relative position of the currently displayed page. The pages of the electronic book are color shaded by a number of display times image generation unit to give a visual indication of the relative number of times each page has been displayed to allow frequently displayed pages to be quickly located by a user. A marker can also be displayed on the screen to indicate pages marked by a user.

The number of times a page is retrieved and viewed is counted and the number stored in a number of display times storage unit. Based on the count for each page, the display of the electronic book is adjusted to reflect these frequencies. The color shading by the number of display times image data generation unit allows a user to view those pages which are frequently viewed more quickly by means of the visual indication. The present invention also is applicable to non-electronic book displays. The present invention can be configured to display the pages according to a predetermined sequential rule by including a display-sequence determination unit and rule holding unit. In another embodiment, the present invention can attach a bookmark to a page to allow a user to quickly to return to the marked page, wherein the mark is graphically displayed on the screen, by means of a marked-page storage unit, mark image control unit, and a mark image data generation unit. In still another embodiment, a user may designate an approximate starting position to begin viewing the book and then the most frequently viewed pages in close proximity to the starting position will be displayed according to a predetermined rule.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 9 is a view showing an example of the content in a number of display times storage unit of the second embodiment;

FIG. 16 is a view showing an example of the content in a number of display times storage unit of the fourth embodiment;

DETAILED EXPLANATION OF THE PREFERRED EMBODIMENTS

Five embodiments of the present invention will be described hereunder with reference to the drawings.

FIRST EMBODIMENT

Figure 1:
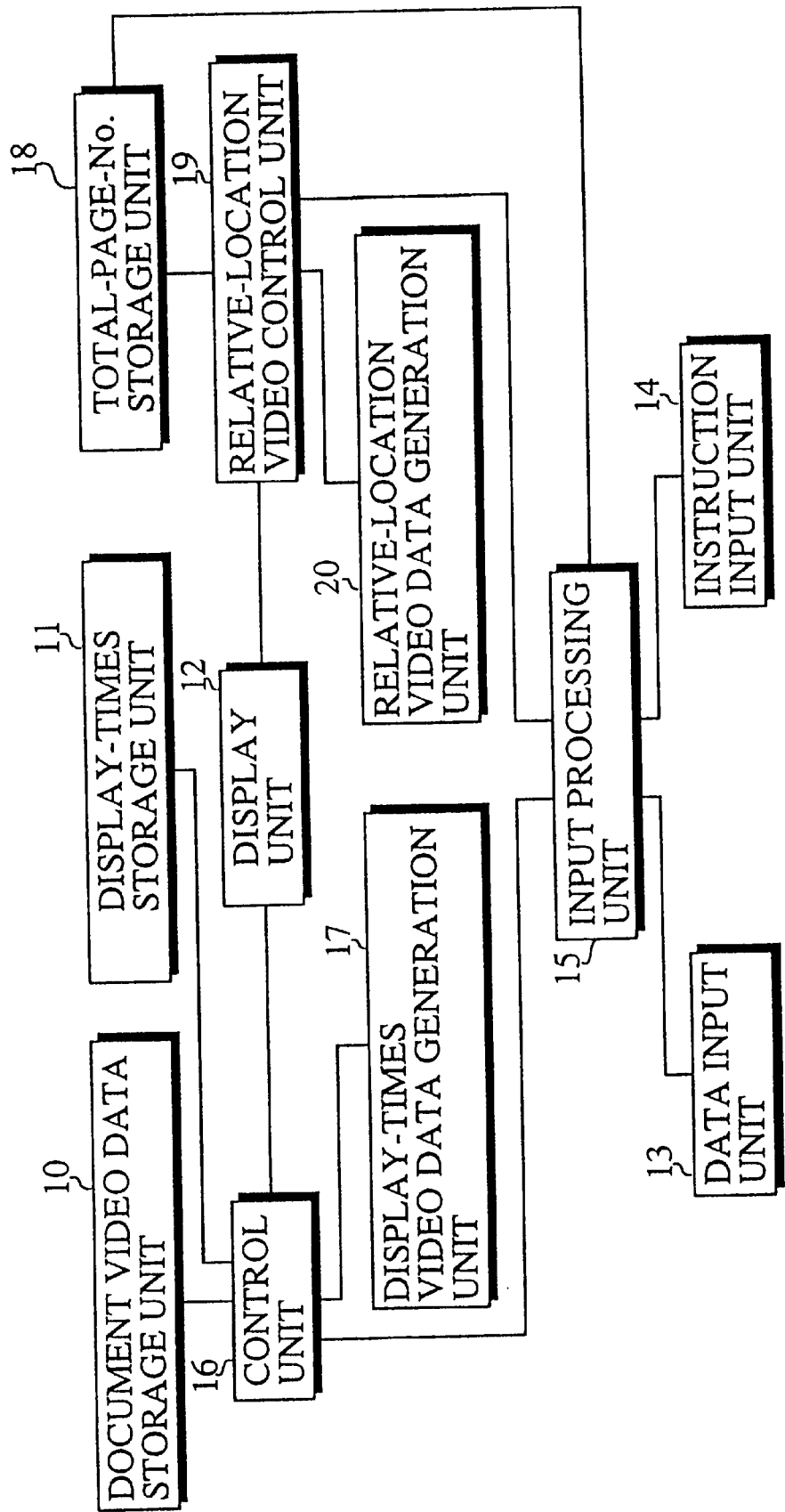
FIG. 1 is a block diagram showing a structure of a page-retrieval apparatus in accordance with the first embodiment of the present invention.

FIG. 1 is a block diagram depicting a structure of a page-retrieval apparatus in accordance with the first embodiment of the present invention. Note that this apparatus can display a document either in an electronic-book display or a non-electronic-book display.

The apparatus comprises a document image data storage unit 10, a number of display times storage unit 11, a display unit 12, a data input unit 13, an instruction input unit 14, an input processing unit 15, a control unit 16, a number of display times image data generation unit 17, a total-page-number storage unit 18, a relative-location image control unit 19, and a relative-location image data generation unit 20.

The document image data storage unit 10, which is, for example, an optical disc unit, stores document image data in relation with their respective page numbers.

Figure 2:
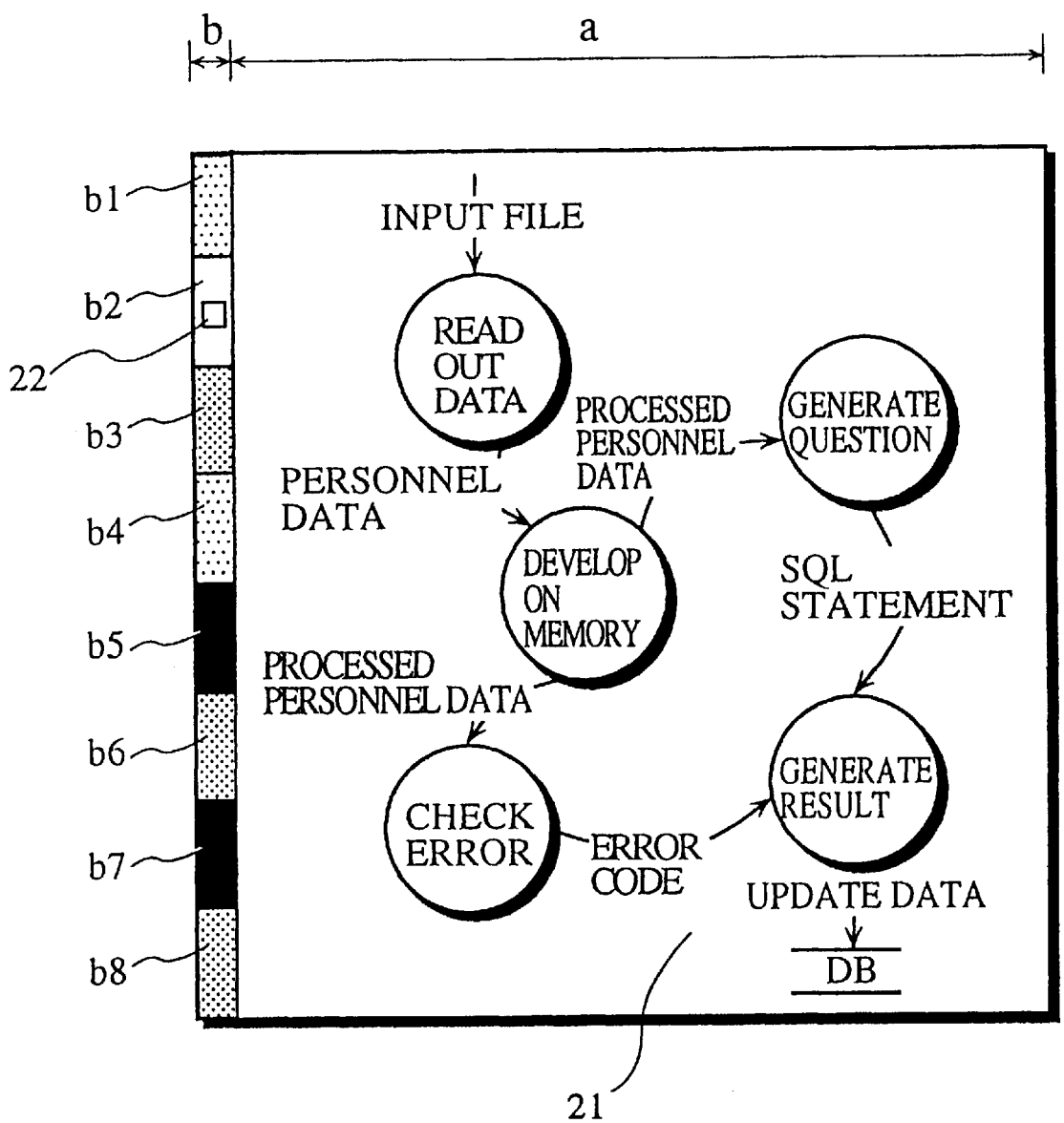
FIG. 2 is a view showing an example of a document image.

The document image data referred to herein are a document converted into image data, which are character and/or image data in effect. Numeral 21 in FIG. 2 is an example of a document image displayed based on the document image data.

The number of display times storage unit 11, which is, for example, an optical disc unit, stores a number of display times L in relation with its respective page numbers.

Figure 7:
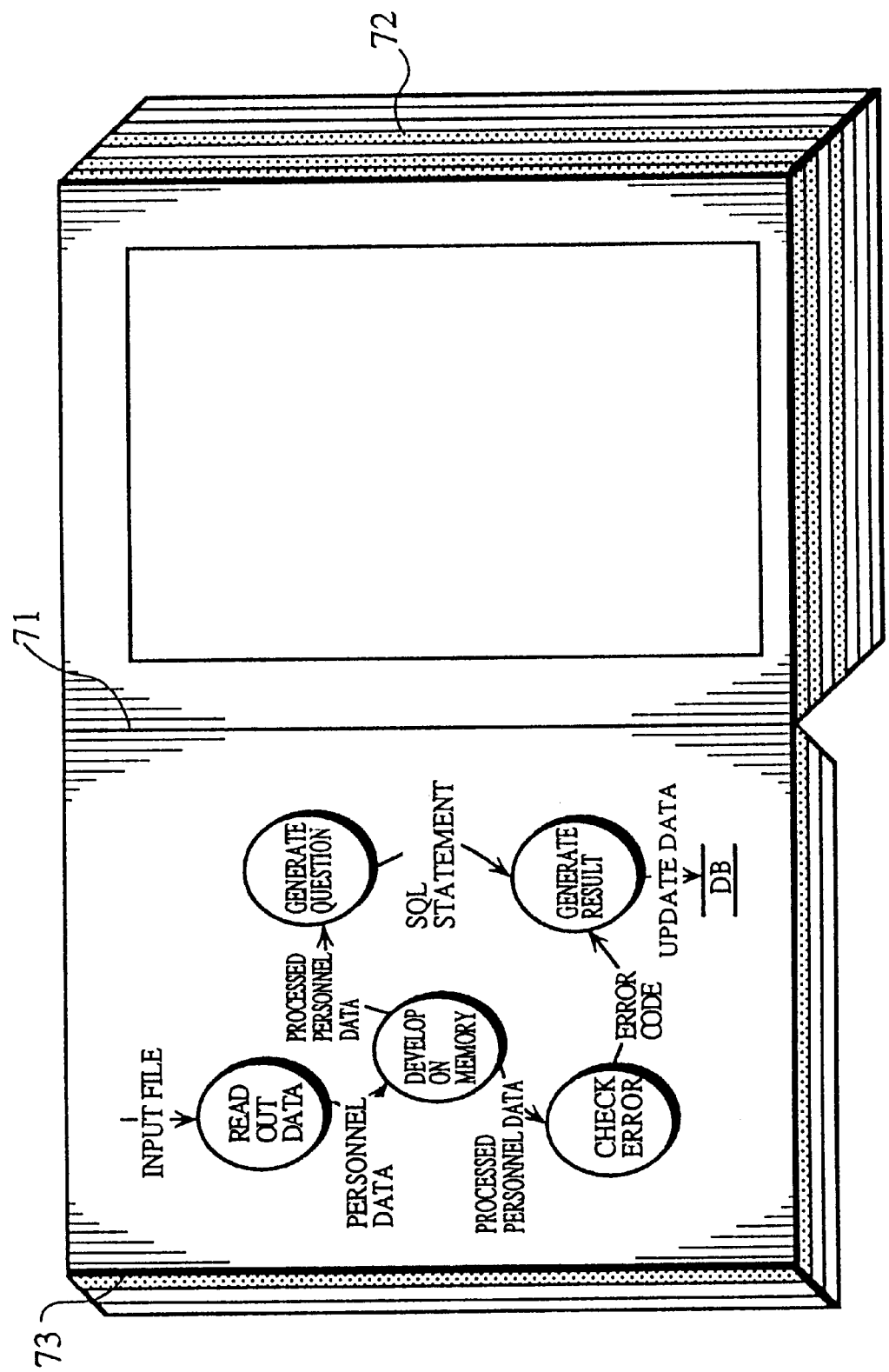
FIG. 7 is a view explaining an electronic-book display by the apparatus of the first embodiment.

The display unit 12, which is, for example, a display screen, displays various kinds of images. In this embodiment, the display unit 12 displays the document image and number of display times images as well as relative-location images based on their respective data. For example, in the case of the non-electronic-book display, the document image is displayed in an area a, while the number of display times image and relative-location image are displayed in an area b as shown in FIG. 2: subdivisions $b_1$–$b_8$ in the area b correspond to one document, and each subdivision corresponds to pages in the document, respectively. Whereas in the case of the electronic-book display, the document image is displayed on an opened page, while the other two images are displayed on the fore-edge of the electronic book as shown in FIG. 7; the documents in FIG. 2 and FIG. 7 are not identical. Note that the number of display times image referred herein is an image displayed based on image data that indicate the number of display times L by the changes in tone; the more frequently a page is displayed, the darker the tone of the image becomes.

The data input unit 13 is, for example, a scanner, and used to input a document into the input processing unit 15 in the form of the document image data.

The instruction input unit 14 is, for example, a keyboard, and used to input an instruction into the input processing unit 15 in the form of a signal. For instance, when a display instruction is inputted, a display signal is sent to the input processing unit 15. Note that the display signal includes a page number K to be retrieved; also it includes a synchronizing signal, so that the control unit 16 and relative-location image control unit 19, respectively, display the document image and the number of display times image, and the relative-location image on the display unit 12 with the same timing.

The input processing unit 15 operates differently upon receipt of the document image data and instruction signal from the data input unit 13 and instruction input unit 14, respectively:

(1) upon receipt of the document image data, the input processing unit 15 numbers them in the sequence of the input, and sends the numbered document image data to the control unit 16 while sending a page number alone to the total-page-number storage unit 18 in the form of a signal;

(2) upon receipt of the display signal, the input processing unit 15 sends the same to both the control unit 16 and relative-location image control unit 19.

Similarly, the control unit 16 operates differently upon receipt of the document image data and an instruction signal from the input processing unit 15. Of the instruction signal is the display signal for convenience of explanation:

(1) upon receipt of the document image data, the control unit 16 stores an initial number of display times L(=0) and page numbers into the number of display times storage unit 11, while storing the document image data into the document image data storage unit 10 together with their respective page numbers;

(2) upon receipt of the display signal, the control unit 16 reads out the number of display times L for the page number K from the number of display times storage unit 11 to send the same to number of display times image data generation unit 17 together with the page number K, and subsequently reads out the page number K's document image data and the number of display times image data respectively from the document image data storage unit 10 and number of display times image data generation unit 17, sending the same to the display unit 12. Also, the control unit 16 counts a display period T with a counter equipped therein while the images are displayed; when the counter counts up to 60 (seconds), the control unit 16 increments the number of display times L and sends the updated number of display times L to the number of display times storage unit 11 together with the page number K.

The number of display times image data generation unit 17 generates the number of display times image data using the number of display times L and page number k; both are read out from the number of display times storage unit 11 by the control unit 16 upon receipt of the display signal from the input processing unit 15.

The total-page-number storage unit 18, which is, for example, an optical disc, stores the page numbers sent from the input processing unit 15.

The relative-location image control unit 19 reads out the total page number from the total-page-number storage unit 18 upon receipt of the display signal from the input processing unit 15, and sends the same to the relative-location image data generation unit 20 together with the page number K, which returns relative-location image data. Accordingly, the relative-location image control unit 19 displays the relative-location image on the display unit 12. The relative-location image referred to herein is an image displayed based on the relative-location image data and indicates a relative location of a currently displayed page within the document.

The relative-location image data generation unit 20 activates upon receipt of the total page number and page number K from the relative-location image control unit 19, and generates the relative-location image data to return the same to the relative-location video control unit 19.

Figure 3:
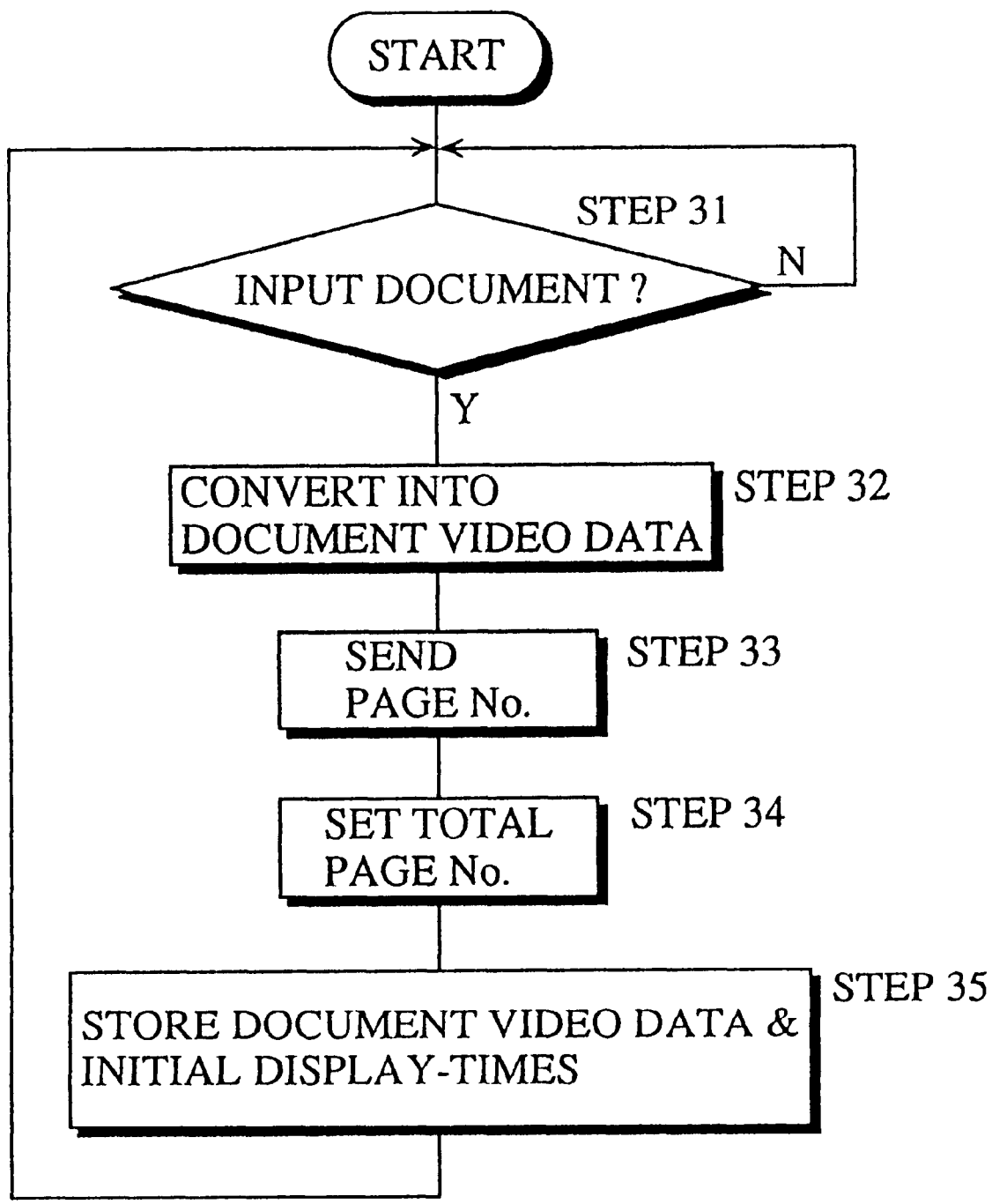
FIG. 3 is a flowchart detailing a document input operation with the apparatus of the first embodiment.

The document input operation with the above-described apparatus will be detailed by reference to the flowchart in FIG. 3.

An operator inputs a document into the data input unit 13 (Step 31), which is accordingly converted into the document image data and sent to the input processing unit 15 (Step 32).

Assume that up to page 8 of the document has been inputted, then the input processing unit 15 numbers the corresponding document image data with the page number 8 and sends the numbered document image data to the control unit 16 (Step 33). At the same time, the input processing unit 15 sends the page number 8 alone to the total page number storage unit 18, so that it stores the same number as the total page number (Step 34).

Subsequently, the document image data storage unit 10 stores the document image data together with the page number 8, while the number of display times image data storage unit 11 stores the initial number of display times L(=0) with the page number 8 under the control of the control unit 16 (Step 35).

Figure 4:
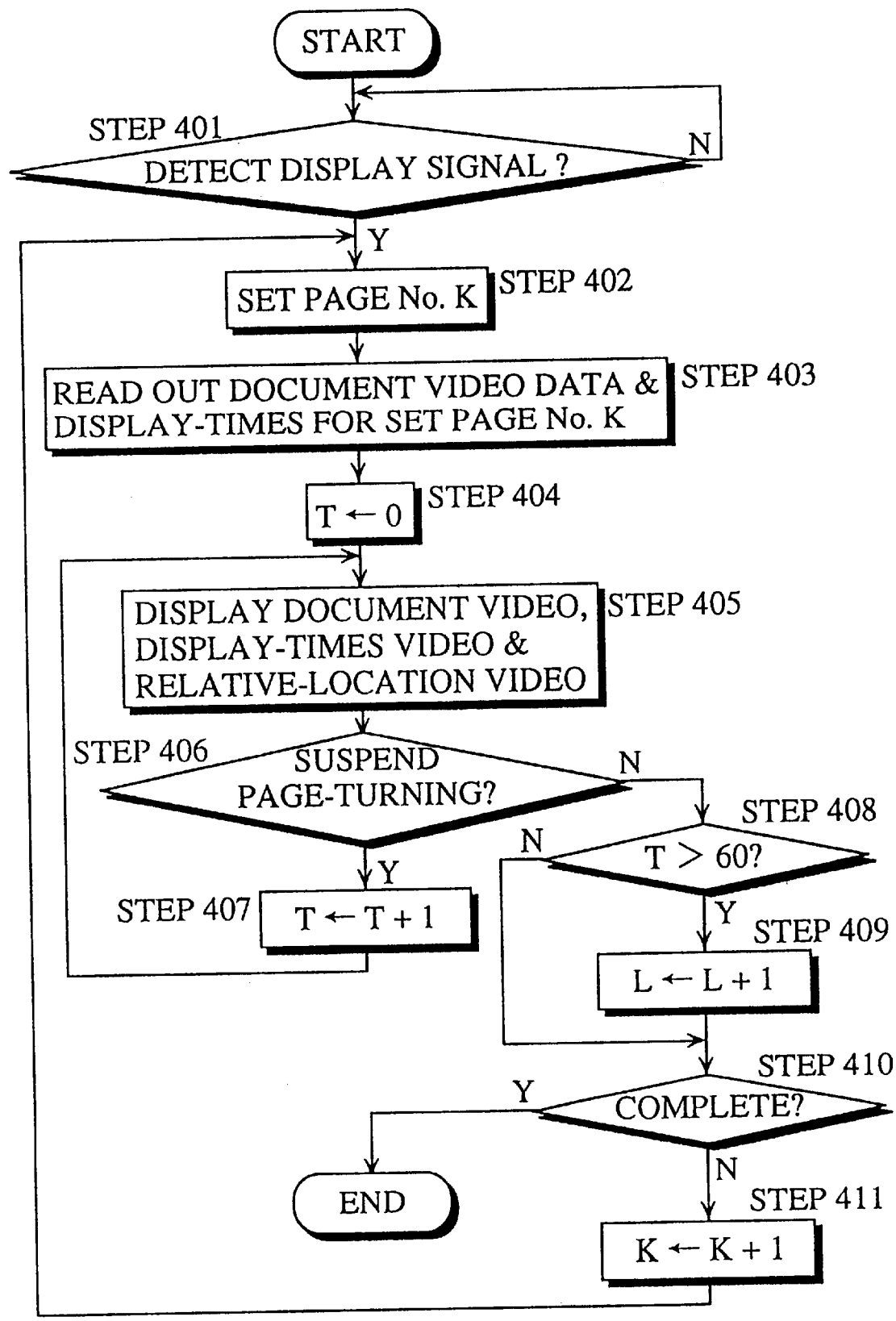
FIG. 4 is a flowchart detailing a page-display operation with the apparatus of the first embodiment.

Next, the operation of the above-described apparatus upon receipt of the display signal will be described with reference to the flowchart in FIG. 4. The explanation for the non-electronic-book display will be given first.

Assume that the operator inputs an instruction to display page 2. Then, having detected the input of the instruction, the instruction input unit 14 sends a display-signal to the input processing unit 15 (Step 401). Upon receipt of the display signal, the input processing unit 15 sets the page number K to 2, and sends the same to the control unit 16 (Step 402).

Accordingly, the control unit 16 reads out the document image data storage unit 10 and the number of display times from the number of display times storage unit 11 both for page 2 (Step 403).

Then, the control unit 16 sets the counter to 0 (Step 404). Accordingly, the display unit 12 displays the document image and the number of display times video returned from the number of display times image data generation unit 17 under the control of the control unit 16, and the control unit 16 starts to count the display period T (Step 405). As previously mentioned, the display unit 12 displays the relative-location image with the same timing under the control of the related-location image control unit 19, which will be described later in more detail.

Note that once the aforementioned images are displayed, pages are automatically turned by a known page-turning function. Thus, when the operator sees the display of page 2 on the display unit 12, he inputs an instruction to suspend the automatic page-turning into the instruction input unit 14, which correspondingly sends a suspend-signal to the input processing unit 15 (Step 406).

Accordingly, the input processing unit 15 sends the suspend-signal to the control unit 16, so that it keeps displaying page 2's document image and counting the display period T until the suspend-signal is turned off (Step 407).

When the operator inputs an instruction to turn off the suspend-signal into the instruction input unit 14, it sends a turn-off-signal to both the control unit 16 and relative-location image control unit 19. Then, the control unit 16 increments the number of display times L when the display period T exceeds 60 seconds (Steps 408, 409).

When the operator inputs an instruction to end the page-display operation into the instruction input unit 14 (Step 410), the instruction input unit 14 sends an end-signal to the input processing unit 15 to stop the output of the display signal. Otherwise, the control unit 16 increments the page number K (Step 411) to return to Step 402, turning the page automatically.

Figure 5:
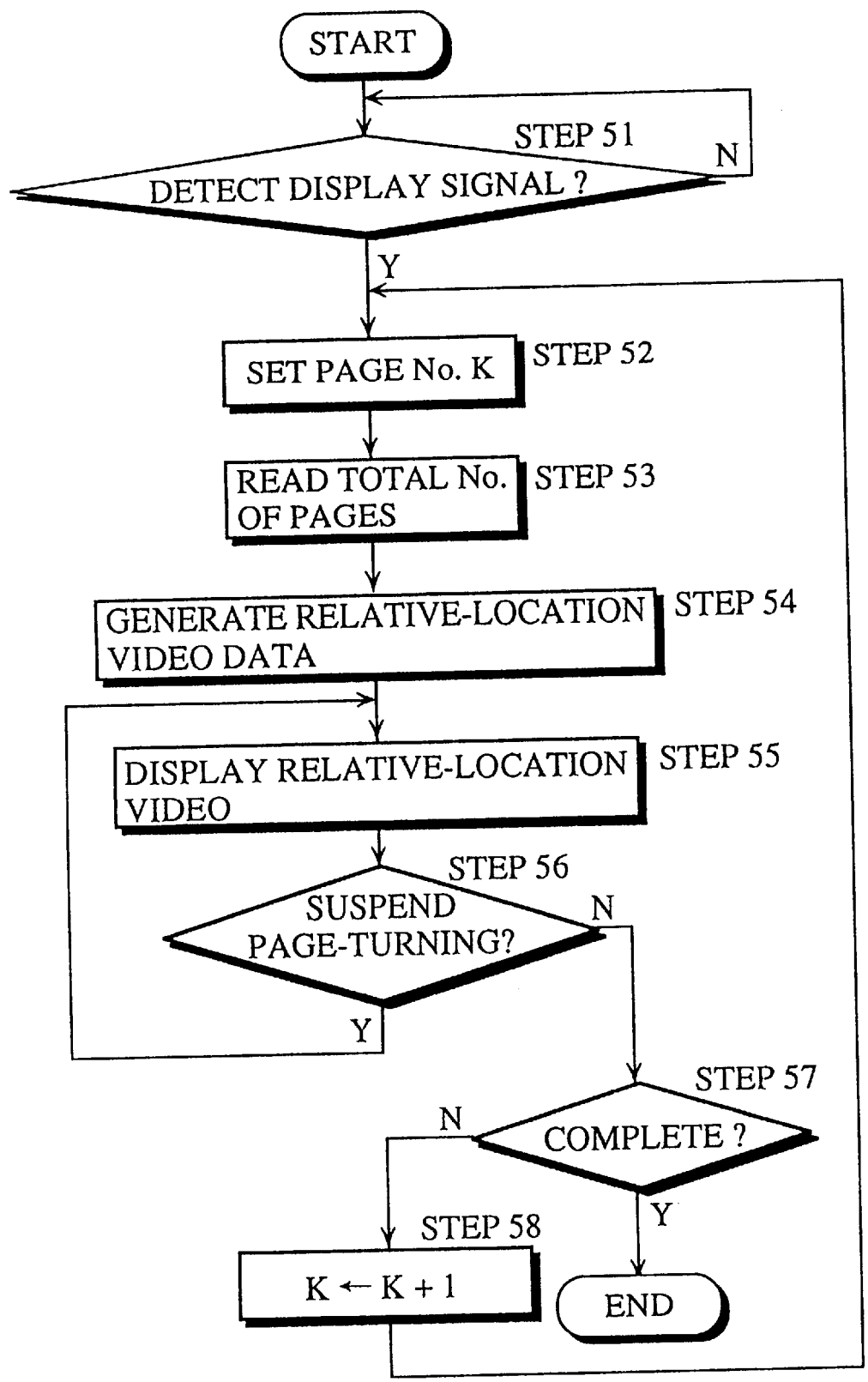
FIG. 5 is a flowchart detailing a relative-location display operation with the apparatus of the first embodiment.

Step 405, where the relative-location image is displayed with the same timing as the other two images, will be described in more detail with reference to the flowchart in FIG. 5.

The instruction input unit 14 detects the display signal when the operator inputs the instruction to display page 2, and sends the same to the input processing 15 (Step 51).

Upon receipt of the display signal, the input processing unit 15 sets the page number K to 2 and sends the same to the relative-location image control unit 19 (Step 52).

Accordingly, the relative-location image control unit 19 reads out the total page number 8 from the total page number storage unit 18, and sends the same to the relative-location image data generation unit 20 together with the page number 2 (Step 53).

Then, the relative-location image data generation unit 20 generates the relative-location image data and returns the same to the relative-location image control unit 19 (Step 54). The relative-location image data in this correspond to a scroll bar 22, or the second subdivision $b_2$ from the top, in FIG. 2.

Accordingly, the display unit 12 displays the relative-location image for page 2 under the control of the relative-location image control unit 19 with the same timing as the document image and the number of display times video image (Step 55).

Upon receipt of the suspend-signal for the automatic page-retrieval from the instruction input unit 14, the input processing unit 15 sends the same to the relative-location image control unit 19. Thus, the display unit 12 displays the relative-location image for page 2 until the suspend-signal is turned off.

processing unit 15 stops sending the display-signal to the control unit 16; otherwise, it increments the page number K and returns to Step 52, turning the page automatically (Step 508).

Figure 6:
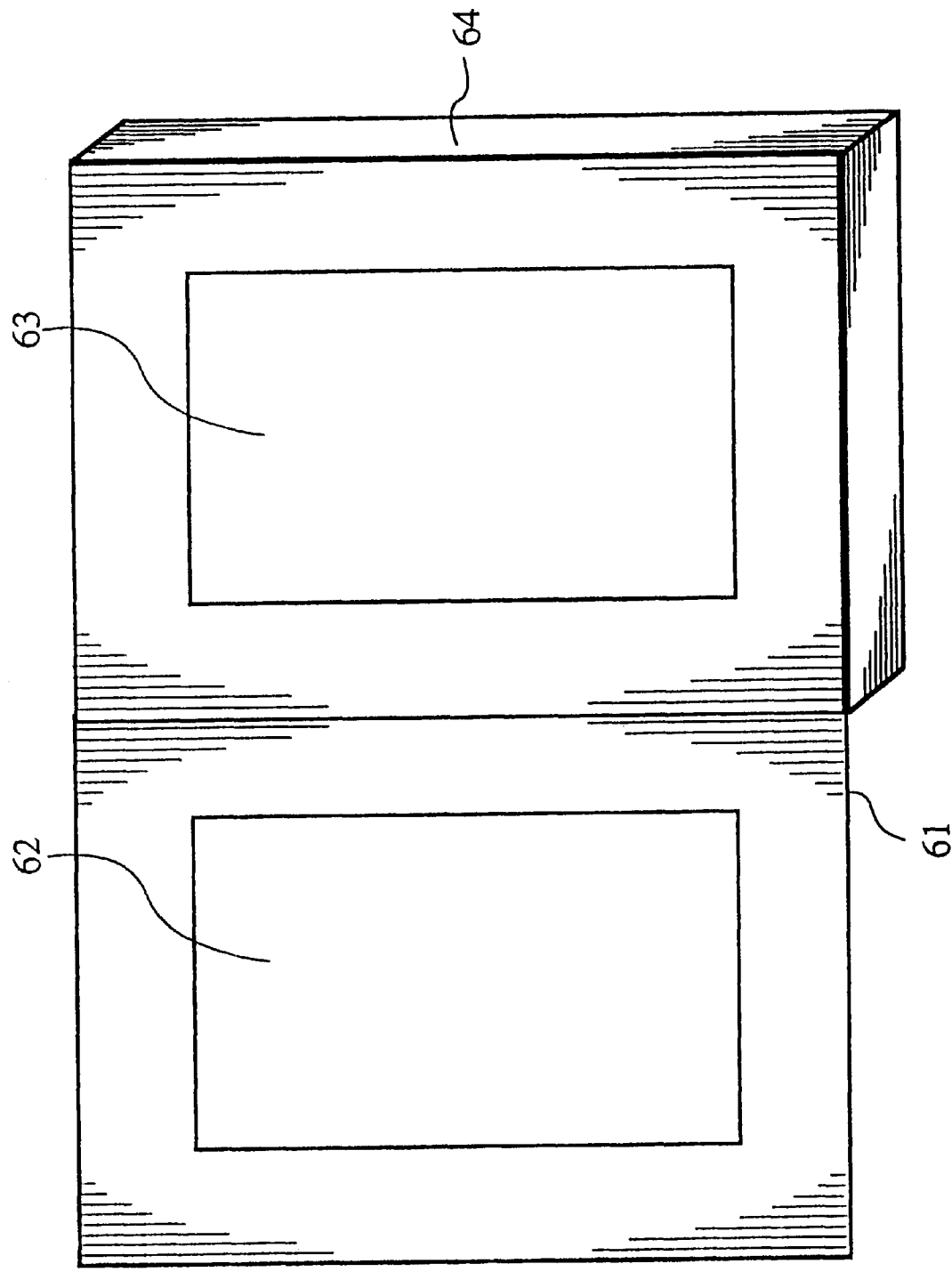
FIG. 6 is a view showing an example of a relative-location image.

The explanation of another display using an electronic-book will be given next. Although the operation is substantially identical with the non-electronic-book display, the relative-location image data generation unit 20 generates the relative-location image data in a two-page spread image, or book image data. The book image data are generated each time a page is turned, and the relative-location of a currently displayed page is shown by a thickness of the fore-edge of the spread book. More specifically, when the total page number is two or less, the book image appears as a book frame 16 alone as shown in FIG. 6, and as the page number increases, the fore-edge thickens: a page image 64 is additionally displayed on the book frame 61 as the page number increases. Similarly, when the page number decreases, the fore-edge lessens. In the book image, the first to the currently displayed pages are shown in the fore-edge on the left, and the following to the last pages on the right.

Likewise, the number of display times image data generation unit 17 generates color-tone data in this case; the more frequently a page is displayed, the darker in tone the page image 64 for that page is displayed.

Also, the control unit 16 maps the center of the book frame 61 to the center of the document images 62, 63 on the display as shown in FIG. 6.

As a result, the book image as shown in FIG. 7 is displayed on the display unit 12; numeral 17 denotes the document image, while numerals 72, 73 denote the display times and relative-location images.

In the foregoing embodiment, the number of display times L is incremented when the display period T exceeds a predetermined period. However, the number of display times L may be decremented from a predetermined value instead of being incremented, and the number of display times L may be the actual number of display times. Also, the predetermined period is not limited to 60 seconds; it can be more or less depending on the type of document.

When a document includes a large number of pages, the document image data may be divided into a set of groups, and a total of the number of display times within each group may be used as the number of display times L.

In the electronic-book display, the first to the currently displayed pages may be shown in the fore-edge on the right, and the following to the last pages on the left. This provides a visual indication of the relative location within the electronic book of the page currently being displayed.

SECOND EMBODIMENT

Figure 8:
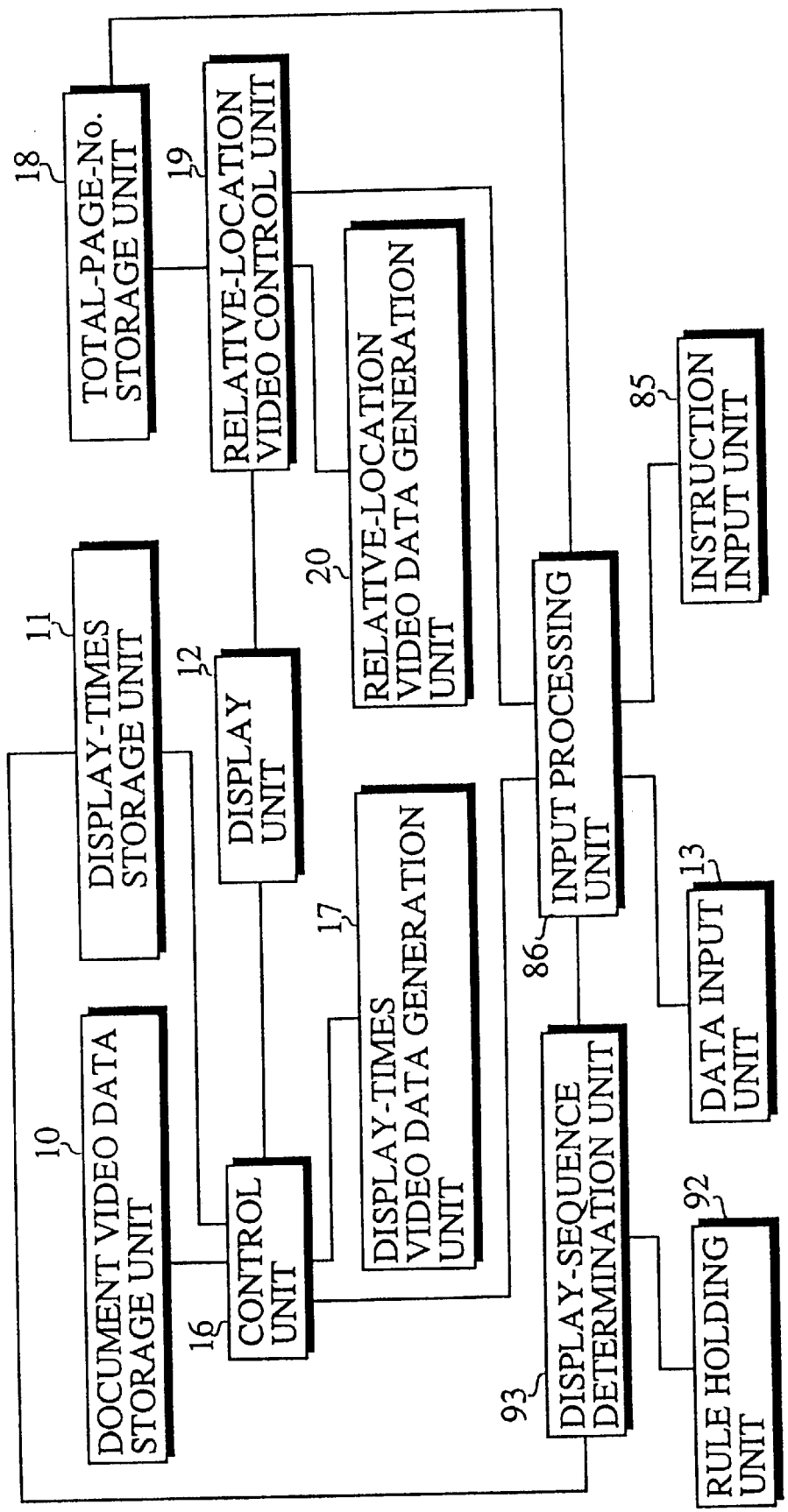
FIG. 8 is a block diagram depicting a structure of a page-retrieval apparatus in accordance with the second embodiment of the present invention.

FIG. 8 is a block diagram depicting a structure of a page-retrieval apparatus in accordance with the second embodiment of the present invention. Compared with the first embodiment, the apparatus of the second embodiment displays the page in accordance with a certain display sequence. For this reason, the apparatus of the second embodiment comprises an instruction input unit 85 instead of the instruction input unit 14, an input processing unit 86 instead of the input processing unit 15, and additionally includes a role holding unit 92 and display-sequence determination unit 93. Hereinafter, like components are labeled with like reference numerals with respect to the first embodiment, and the description of these components is not repeated.

The number of display times storage unit 11 stores the number of display times in relation with their respective page numbers as shown in FIG. 9.

The instruction input unit 85, compared with the instruction input unit 14, additionally receives a sequential-display instruction, and sends a sequential-display signal to the input processing unit 86. The sequential-display instruction referred to herein is an instruction to display the pages in an order determined by a certain rule.

The input processing unit 86, compared with the input processing unit 15, additionally receives the sequential-display signal from the instruction input unit 85, and sends the same to the display-sequence determination unit 93.

The rule holding unit 92 holds a rule that regulates the document image data readout; the rule herein is to read out the document image data in a top-to-bottom order of the number of display times.

The display-sequence determination unit 93 reads out the rule from the rule holding unit 92 upon receipt of the sequential-display the sequential-display signal, and thus reads out the page numbers in the top-to-bottom order of the display-times to send the same to the control unit 16 through the input processing unit 86.

Figure 10:
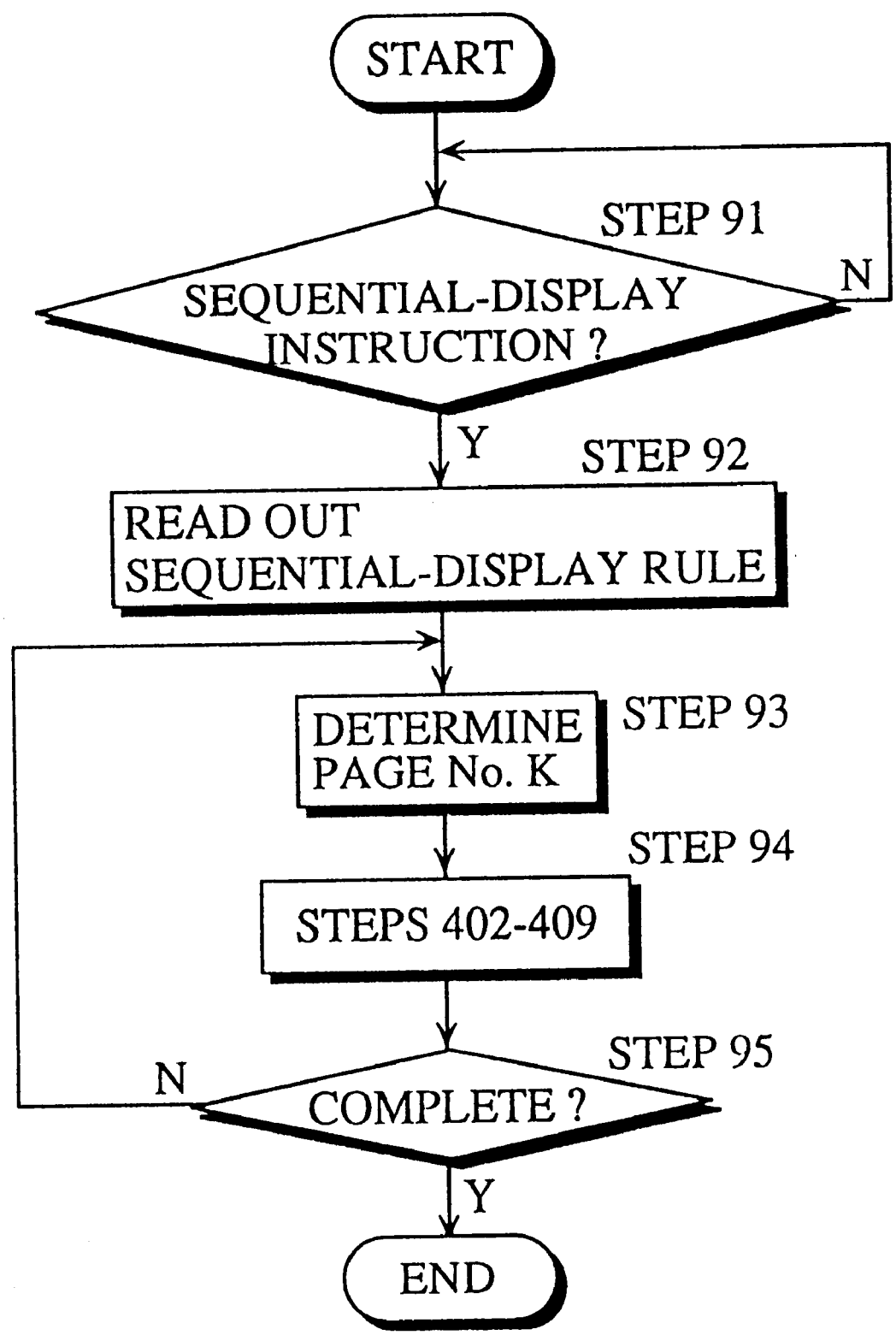
FIG. 10 is a flowchart detailing a sequential-display operation by the apparatus of the second embodiment.

The operation of the above-described apparatus will be explained with reference to the flowchart in FIG. 10.

An operator inputs the sequential-display instruction into the instruction input unit 85, and the instruction input unit 85 sends the sequential-display signal to the input processing unit 86 (Step 91). Accordingly, the input processing unit 86 sends the sequential-display signal to the display-sequence determination unit 93 which correspondingly reads out the rule from the rule holding unit 92 (Step 92).

The display-sequence determination unit 92 reads out the number of display times Ls in relation with the page numbers from the display times storage unit 11, and determines the display-sequence under the rule (Step 93). FIG. 9 shows that page 2 has been the most frequently displayed within the document; thus, the display-sequence determination unit 92 sets the page number K to be retrieved to 2 in the first place.

Then, the display-sequence determination unit 93 sends the page number 2 to the input processing unit 86. Accordingly, the document and the display times videos as well as the relative-location image are displayed on the display unit 12 in the same way as the first embodiment (Step 94=Steps 402 through 409 in the first embodiment).

When the operator inputs the instruction to end the sequential-display operation into the instruction input unit 85 (Step 95), the instruction input unit 85 sends the end-signal to the input processing unit 86 to stop the output of the sequential-display signal. Otherwise, the input processing unit 86 returns to Step 93, turning the page in the determined sequence.

THIRD EMBODIMENT

Figure 11:
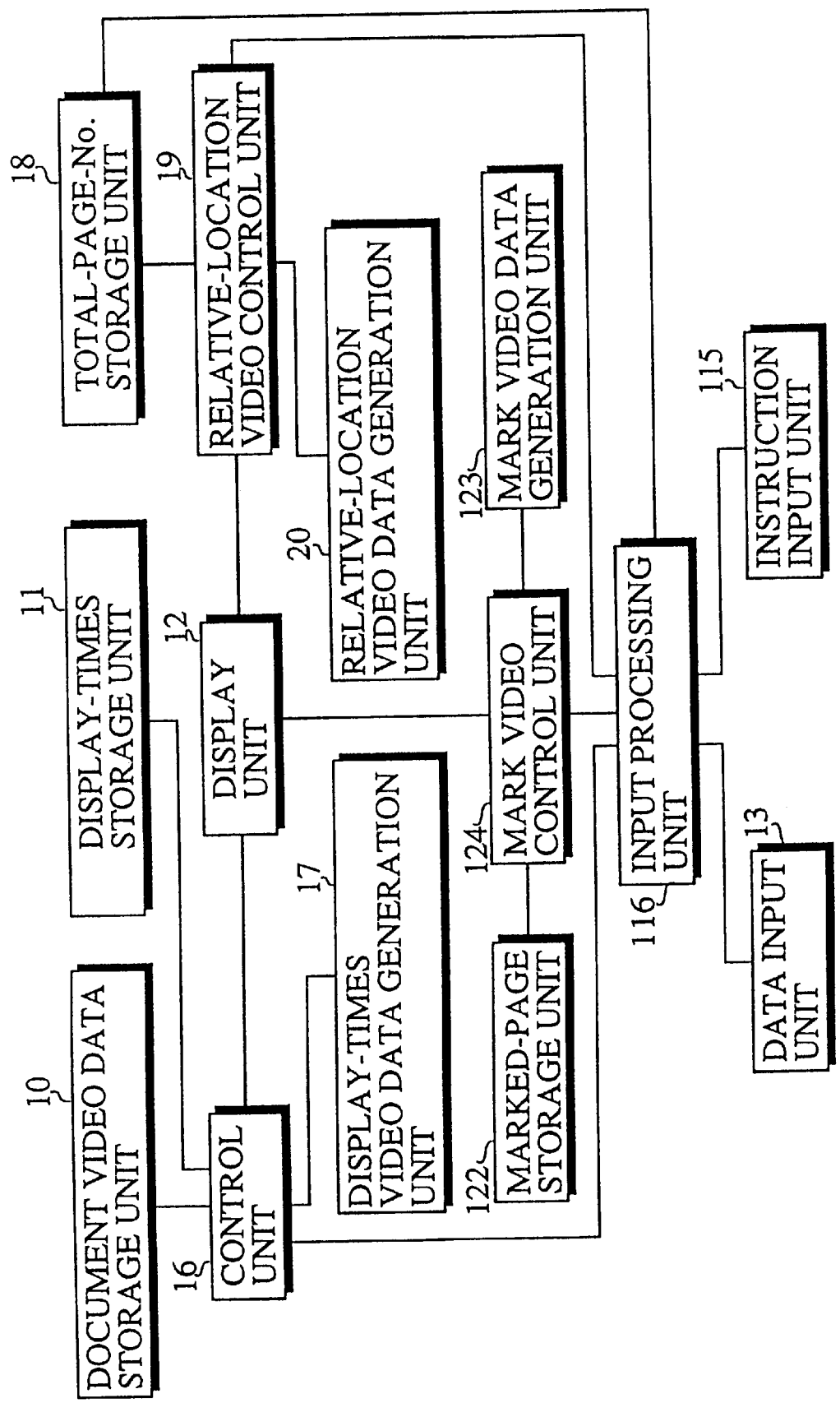
FIG. 11 is a block diagram depicting a structure of a page-retrieval apparatus using an electronic-book display in accordance with the third embodiment of the present invention.

FIG. 11 is a block diagram depicting a structure of a page-retrieval apparatus using an electronic-book display in accordance with the third embodiment of the present invention. Compared with the first embodiment, the apparatus of the third embodiment can attach a mark to an arbitrary page for page-retrieval at a later time. For this reason, the apparatus of the third embodiment compares the instruction input unit 115 instead of the instruction input unit 14 and the input processing unit 116 instead of the input processing unit 15, and additionally includes a marked-page storage unit 122, a mark image data generation unit 123, and a mark image control unit 124. Hereinafter, like components are labeled with like reference numerals with respect to the first embodiment, and the description of these components is not repeated.

The instruction input unit 115, compared with the instruction input unit 14, additionally receives an instruction to attach a mark to an arbitrary selected page within a currently displayed document, and sends a mark-attach signal to the input processing unit 116. Also, the instruction input unit 115 receives an instruction to display pages along with the marks and sends the same to the input processing unit 116.

The input processing unit 116, compared with the input process unit 15, additionally receives the mark-attach and marked-page display signals from the instruction input unit 15:

1) upon receipt of the mark-attach signal, the input processing unit 116 reads out the total page number from the total-page-number storage unit 18, and sends the same with the mark-attach signal to the mark image control unit 124. In addition, the input processing unit 116 stores a relatively large number, such as 1000 or infinity (4), into the display times storage unit 11 with the marked-page through the control unit 16. This is done to distinguish the marked-pages from non-marked-page to facilitate the page-retrieval at a later time: when an operator wishes to display the marked-pages in an order of the display times, the control unit 16 reads out the distinguishable display times of the marked-pages from the number of display times storage unit 11.

2) upon receipt of the marked-page display signal, the input processing unit 116 sends the same to the mark image control unit 124 to read out all the page numbers along with the marks from the marked-page storage unit 122 to further send the same to the control unit 16 and relative-location image control unit 19.

The marked-page storage unit 122 stores page numbers sent from the mark image control unit 124.

The mark image data generation unit 123 generates mark image data with the page number and total page number sent from the mark image control unit 124.

The mark image control unit 124 operates differently upon receipt of the mark-attach signal and marked-page display signal:

1) upon receipt of the mark-attach signal, the mark image control unit 124 sends the same to the mark image data generation unit 123 together with the total page number while storing the page number contained in the mark-attach signal into the marked-page storage unit 122; when the mark image data are sent from the mark image data generation unit 123, the mark image control unit 124 displays the same on the display unit 12;

2) upon receipt of the marked-page display signal, the mark image control unit 124 reads out all the page numbers along with the marks from the marked-page storage unit 122 and sends the same to the input processing unit 116.

Figure 12:
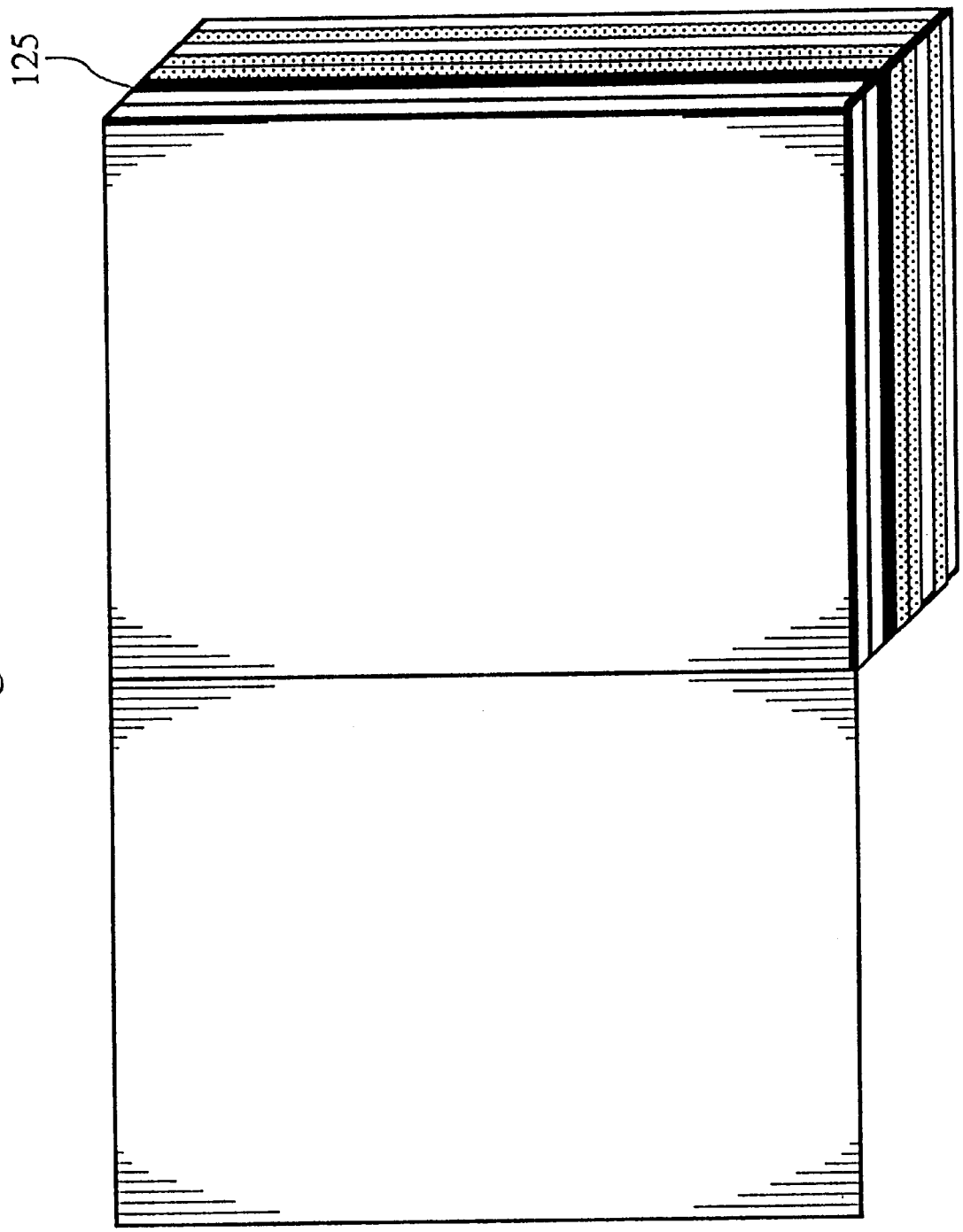
FIG. 12 is a view showing an example of a mark image in the third embodiment.
Figure 13:
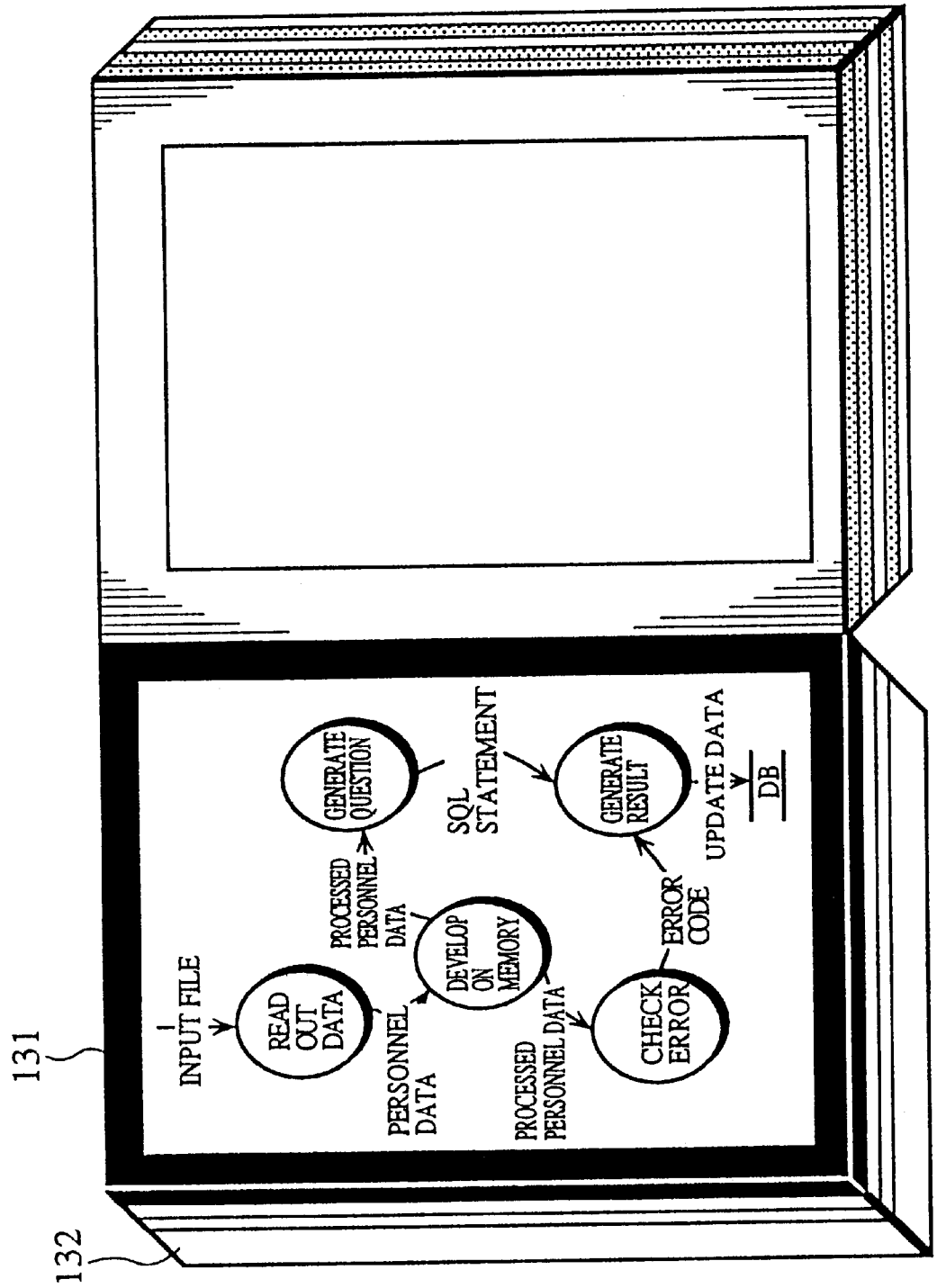
FIG. 13 is a view showing an example of an electronic-book along with a mark in the third embodiment.

Note that a page along with the mark is displayed, for example, black in the fore-edge; numeral 125 in FIG. 12 is an example of a display of the marked-page. However, the mark may be displayed in any color other than black. In addition, as shown in FIG. 13, the mark may be displayed by partially coloring the frame denoted as numeral 131, or by varying the page image's thickness denoted as numeral 132.

Figure 14:
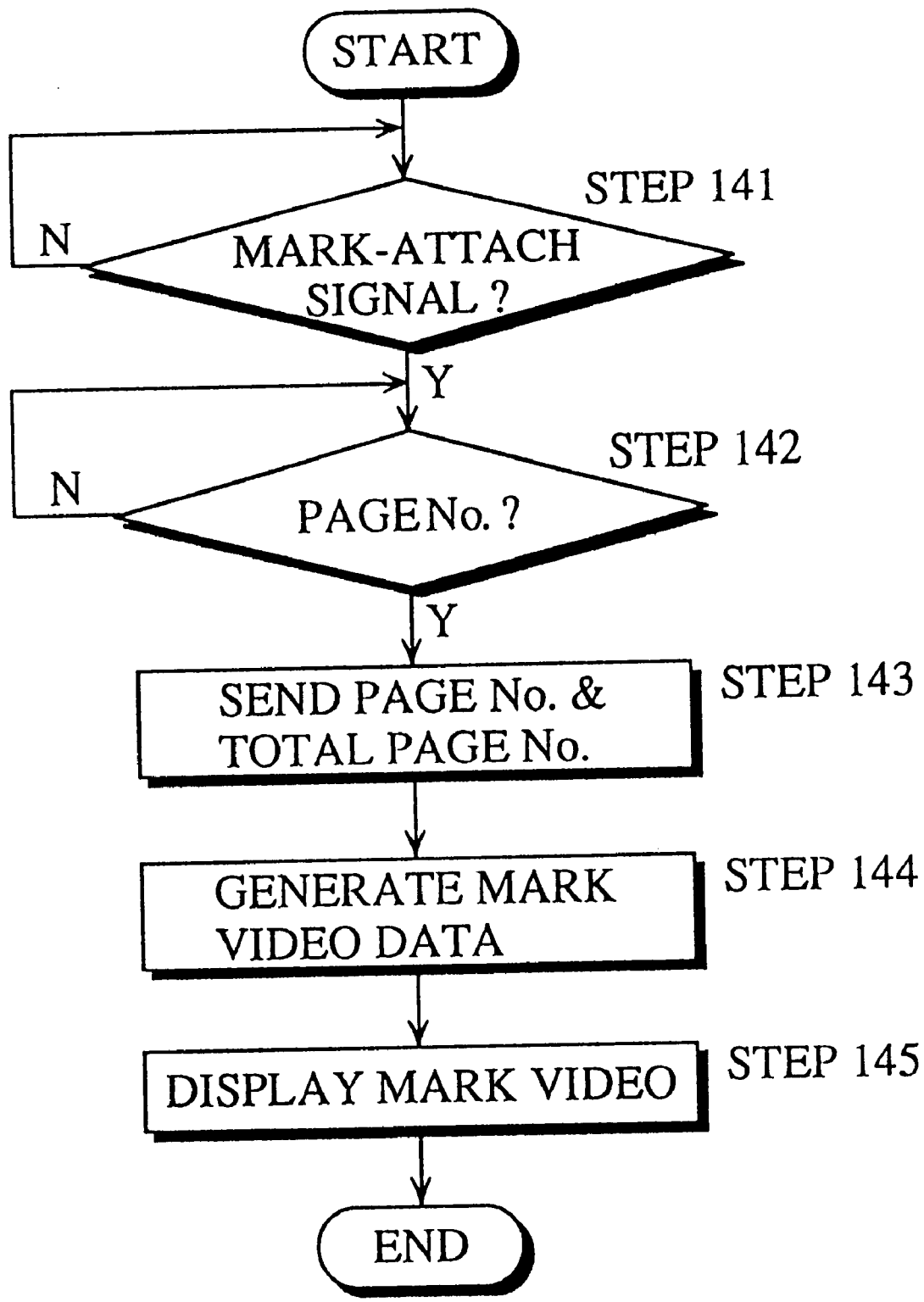
FIG. 14 is a flowchart detailing a mark-attach operation in the third embodiment.

The mark-attach operation of the above-described apparatus will be detailed by the flowchart in FIG. 14.

An operator inputs the mark-attach instruction and the page number K to be marked into the instruction input unit 14 which accordingly sends the same to the input processing unit 116 in the form of the mark-attach signal (Steps 141, 142).

The input processing unit 116 reads out the total page number from the total-page-number storage unit 18, and sends the same to the mark image control unit 124 together with the mark-attach signal (Step 143).

Then, the mark video control unit 124 sends the total page number and the page number K to the mark video data generation unit 123, which accordingly generates the mark image data using these data and returns the same to the mark image control unit 124 (Step 144).

Consequently, the mark image control unit 124 displays the mark image on the display unit 12 (Step 145).

FOURTH EMBODIMENT

Figure 15:
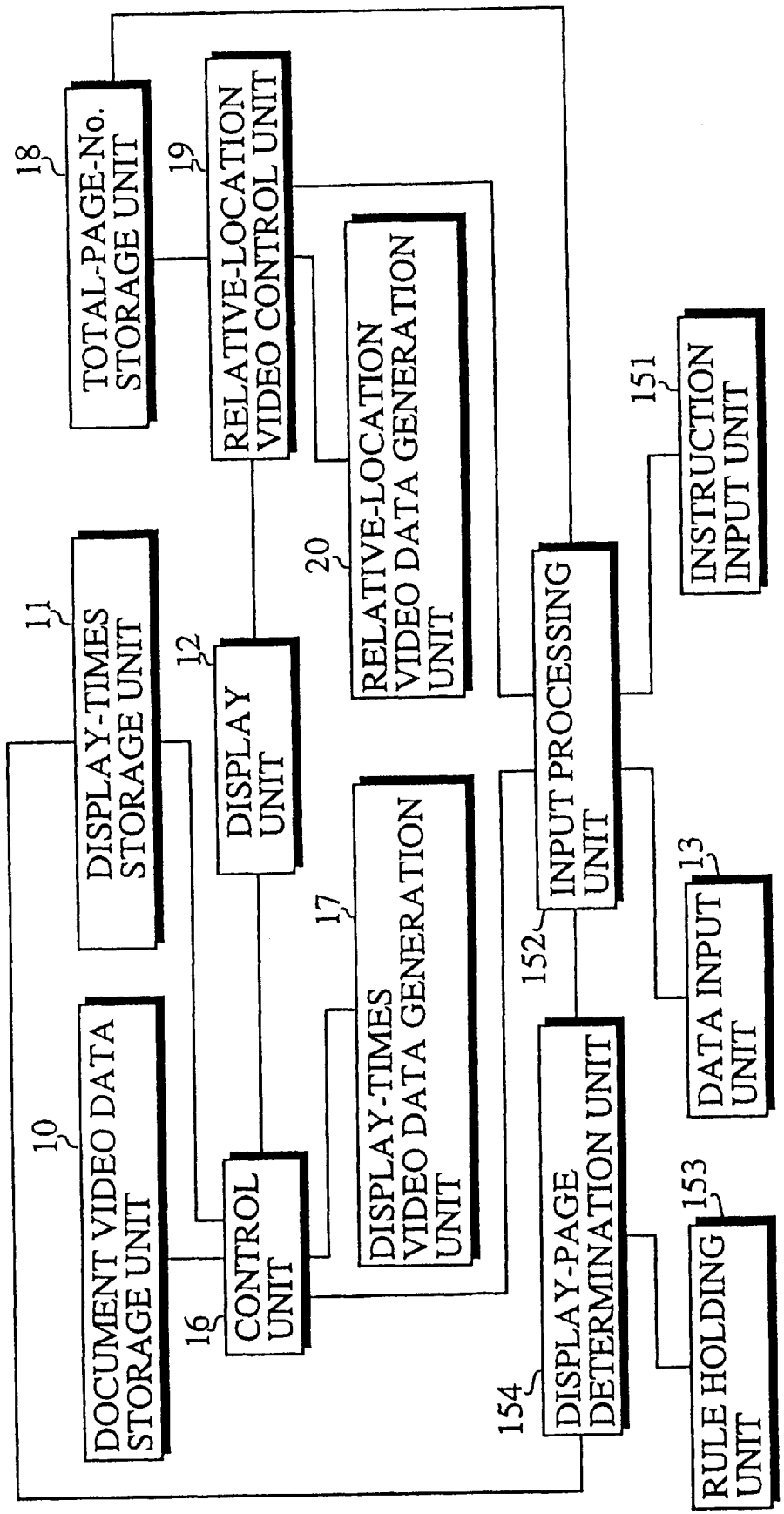
FIG. 15 is a block diagram depicting a structure of a page-retrieval apparatus using an electronic-book display in accordance with the fourth embodiment of the present invention.

FIG. 15 is a block diagram depicting a structure of a page-retrieval apparatus using an electronic-book display in accordance with the fourth embodiment of the present invention. Compared with the first embodiment, the apparatus of the fourth embodiment can retrieve a page under a predetermined rule by designating an approximate point on the electronic-book display. For this reason, the apparatus of the fourth embodiment comprises an instruction input unit 151 instead of the instruction input unit 14, an input processing unit 152 instead of the input processing unit 15, and additionally includes a rule holding unit 153, and a display-page determination unit 154. Hereinafter, like components are labeled with like reference numerals with respect to the first embodiment, and the description of these components is not repeated.

The instruction input unit 151 is used to input a page-turning instruction from an operator, which is inputted by designating a point on a two-page spread electronic-book display with a pointing device, such as a mouse, and sends a coordinate of the designated point to the input processing unit 152 in the-form of a page-turning signal.

The input processing unit 152 reads out the coordinates of each page in the fore-edge of an electronic-book from the relative-location image control unit 19 upon receipt of the page-turning signal, and determines first page numbers to be retrieved by finding a match between the coordinates from the relative-location image control unit 19 and instruction input unit 151; the first page numbers thus determined are sent to the display-page determination unit 154, which returns second page numbers which are to be sent to the control unit 16 and relative-location image control unit 19. Note that the first page numbers are invariably determined in a pair given the two spread electronic-book display, and so are the second page numbers.

The rule holding unit 153 holds a rule that regulates the page display on the display unit 12. The rule herein is to display the most frequently displayed page within five pages before and after the first page numbers.

The display-page determination unit 154 reads out the rule from the rule holding unit 153 upon receipt of the first page numbers from the input processing unit 152. Accordingly, the display-page determination unit 154 reads out the number of display times Ls for 10 pages (before and after five pages from the first page numbers) from the number of display times storage unit 11 to determine the second page numbers. The second page numbers thus determined are sent to the input processing unit 152 as the page number to be displayed.

The number of display times storage unit 11 stores the page numbers in a column 161 in relation with the number of display times Ls in a column 162 as shown in FIG. 16.

Figure 17:
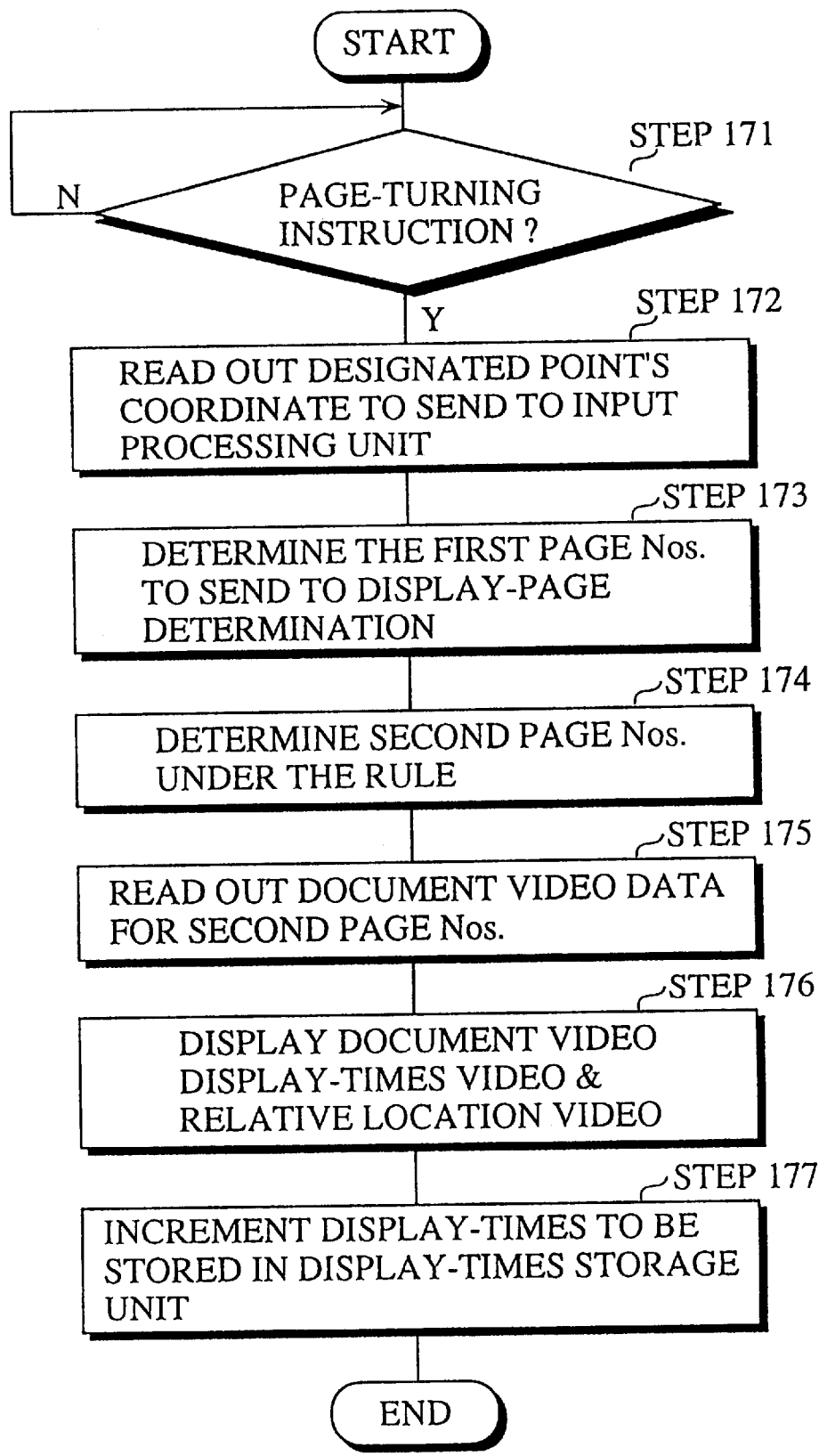
FIG. 17 is a flowchart detailing a page-turning operation of the apparatus of the fourth embodiment.

Next, the page-turning operation of the above apparatus will be described with reference to the flowchart in FIG. 17.

An operator inputs a page-turning instruction by designating an approximate point in the fore-edge of the two-page spread electronic-book for the page to be displayed with the pointing device (Step 171).

Then, the instruction input unit 151 reads the coordinate of the designated point, and sends the same to the input processing unit 152 (Step 172).

Subsequently, the input processing unit 152 reads out the coordinates of each page in the fore-edge from the relative-location image control unit 19, and determines the first page numbers by finding a match between the coordinates from the relative-location image control unit 19 and instruction input unit 151; the first page numbers thus determined are sent to the page determination unit 154. For example, if the input coordinates match with those of pages 5, 6, then "5", "6" are sent to the page determination unit 154 as the first page numbers (Step 173). Accordingly, the display page determination unit 154 reads out the rule from the rule holding unit 153, i.e., "display the most frequently displayed page within five pages before and after the first page numbers", and reads out the number of display times Ls for pages 1-10. Given that a number 135 is the largest in FIG. 16, the display-page determination unit 154 determines the corresponding pages 3, 4 as the second page numbers, which are displayed in effect (Step 174).

The control unit 16 receives the page numbers 3, 4 from the page determination unit 154 via the input processing unit 152, and subsequently reads out the document video data from the document video data storage unit 10 for the corresponding pages (Step 175).

Accordingly, the control unit 16 controls the display unit 12 to display the document image for pages 3, 4 with the display times image data stored in the number of display times storage unit 11. At the same time, the relative-location image control unit 19 controls the display unit 12 to display the relative-location image for pages 3, 4 upon receipt of the corresponding page numbers from the page determination unit 154 via the input processing unit 152: it controls the relative-location image data generation unit 20 to generate the relative-location image data using the data read out from the total-page number storage unit 18 (Step 176).

The control unit 16 increments the number of display times L for pages 3, 4 when the display period T exceeds 60 seconds, and ends the page-turning operation when an end-instruction is inputted (Step 177).

FIFTH EMBODIMENT

Figure 18:
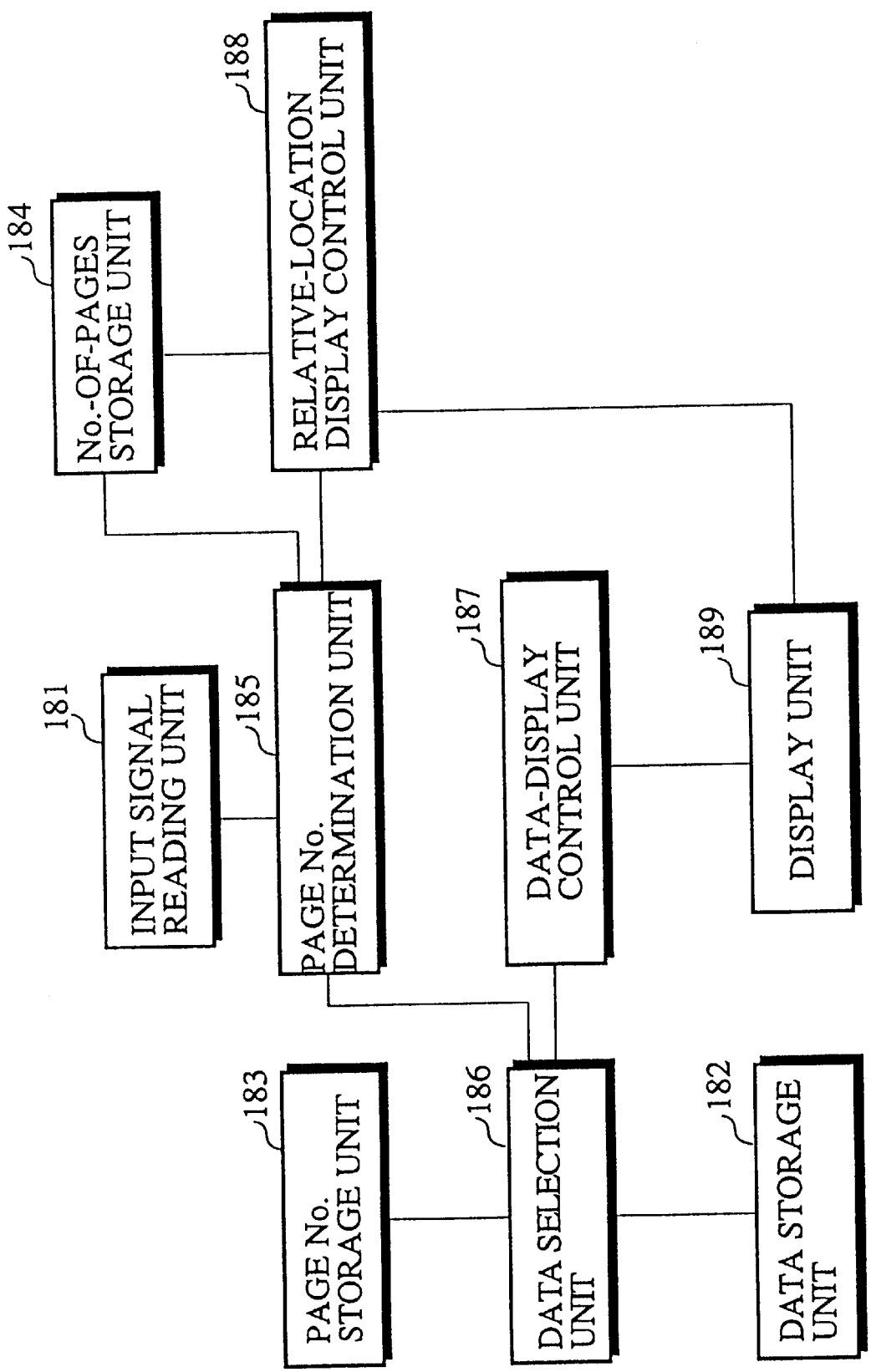
FIG. 18 is a block diagram depicting a structure of a page-retrieval apparatus using an electronic-book display in accordance with the fifth embodiment of the present invention.

FIG. 18 is a block diagram depicting a structure of a page-retrieval apparatus using an electronic-book display in accordance with the fifth embodiment of the present invention. The apparatus of the fifth embodiment can open a closed indexed electronic-book, such as a dictionary, by designating an index.

The apparatus comprises an input signal reading unit 181, a data storage unit 182, a page-number storage unit 183, a number-of-pages storage unit 184, a page-number determination unit 185, a data selection unit 186, a data-display control unit 187, a relative-location-display control unit 188, and a display unit 189.

The input signal reading unit 181 reads a signal of a page-opening instruction from an operator, which is inputted by designating a point with a pointing device, such as a mouse, and sends a coordinate of the designated point to the page number determination unit 185 in the form of a page-opening signal. The page-opening instruction is inputted, for example, by pointing one of index units 192 in the fore-edge of a closed electronic-book 191 shown in FIG. 19 with the pointing device.

The data storage unit 182 stores the actual data of an electronic-book.

The page-number storage unit 183 stores page numbers in relation to their respective addresses in the data storage unit 182.

The number-of-pages storage unit 184 stores the total number of pages of the electronic-book, and the number of pages of each group, or namely an index, that collectively composes the electronic-book.

The page number determination unit 185 determines a page number to be opened upon receipt of the coordinate from the input signal reading unit 181. The page number to be opened is determined by the following steps of:

1) reading out the total page number and the number of pages of each index from the number-of-pages storage unit 184;

2) generating a function that uses the coordinates of the index units 192 as parameters; and 3) substituting the coordinate of the designated index unit 192 in the function.

The page number thus determined is sent to the relative-location-display control unit 188 and data selection unit 186. Note that the length of each index unit 192 is determined by dividing the height of the fore-edge by the number of the units; whereas the width of each index unit 192 is determined by dividing the width of the fore-edge by a ratio of the total page number of each index to the total page number of the document. Only a Y coordinate is used as the parameter to specify each index unit 192 herein.

The data selection unit 186 reads out the addresses in the data storage unit 182 for the determined page number and a following page number from the page-number storage unit 183 upon the receipt of the determined page number, and reads out the actual-data stored in the two readout addresses from the data storage unit 182 to send the same to the data display control unit 187. The addresses of two pages are invariably read out given the two-page spread electronic-book.

The relative-location-display control unit 188 reads out the total number of pages and the number of pages for each index from the number-of-pages storage unit 184. Using these two numbers, two types of electronic-books are displayed: closed and opened (i.e., two-page spread).

Figure 19:
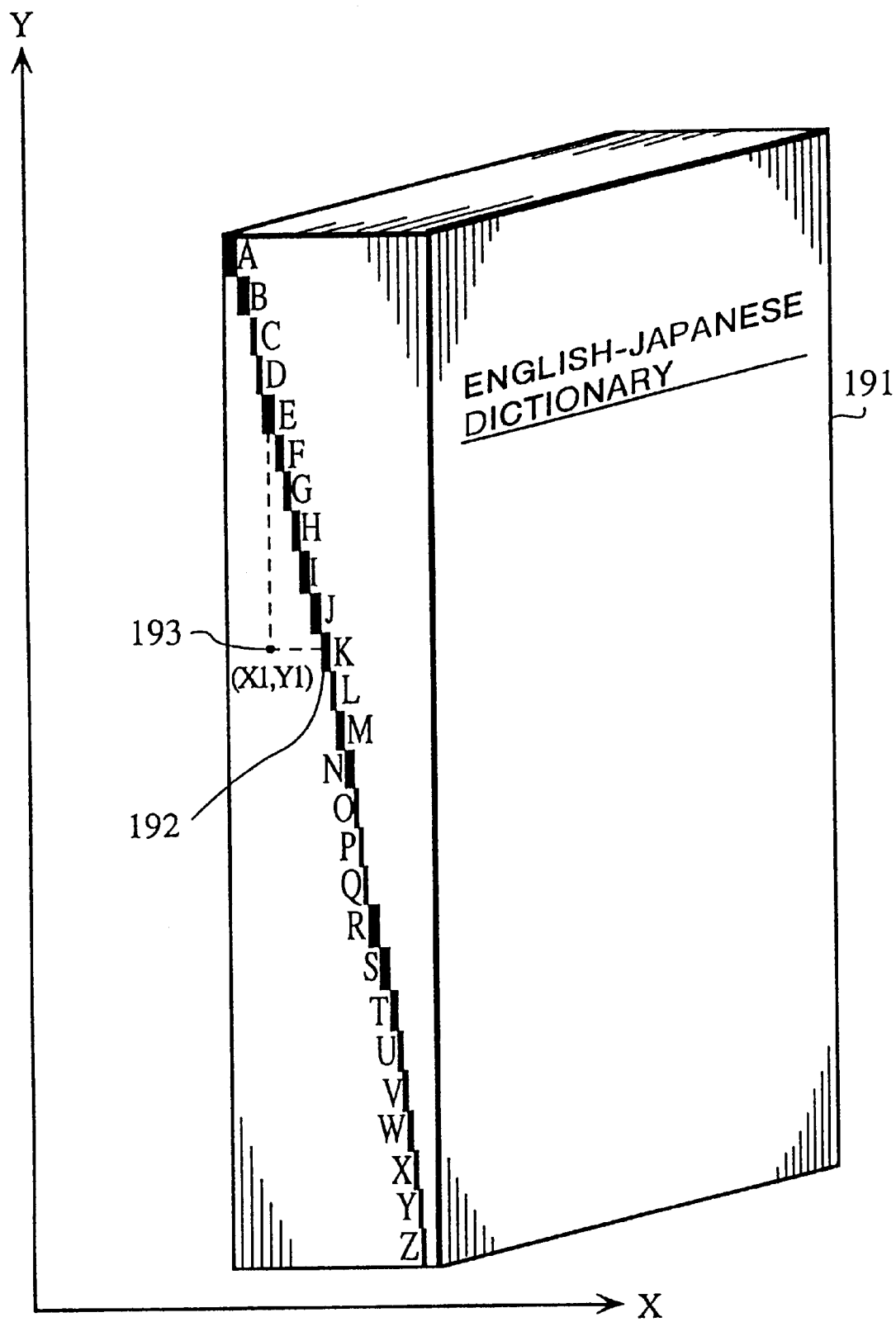
FIG. 19 is a view showing an example of a closed indexed-electronic-book of the fifth embodiment.

With the closed electronic-book, which is shown as numeral 191 in FIG. 19, the total number of pages is displayed by the thickness of the book, or namely, the fore-edge and head or foot; each index unit 192 is displayed in a thickness proportional to a ratio of their respective total page numbers to the total page number of the document and in a color different from its background; also, each index unit 192 is displayed in one line by shifting one from another.

Figure 20:
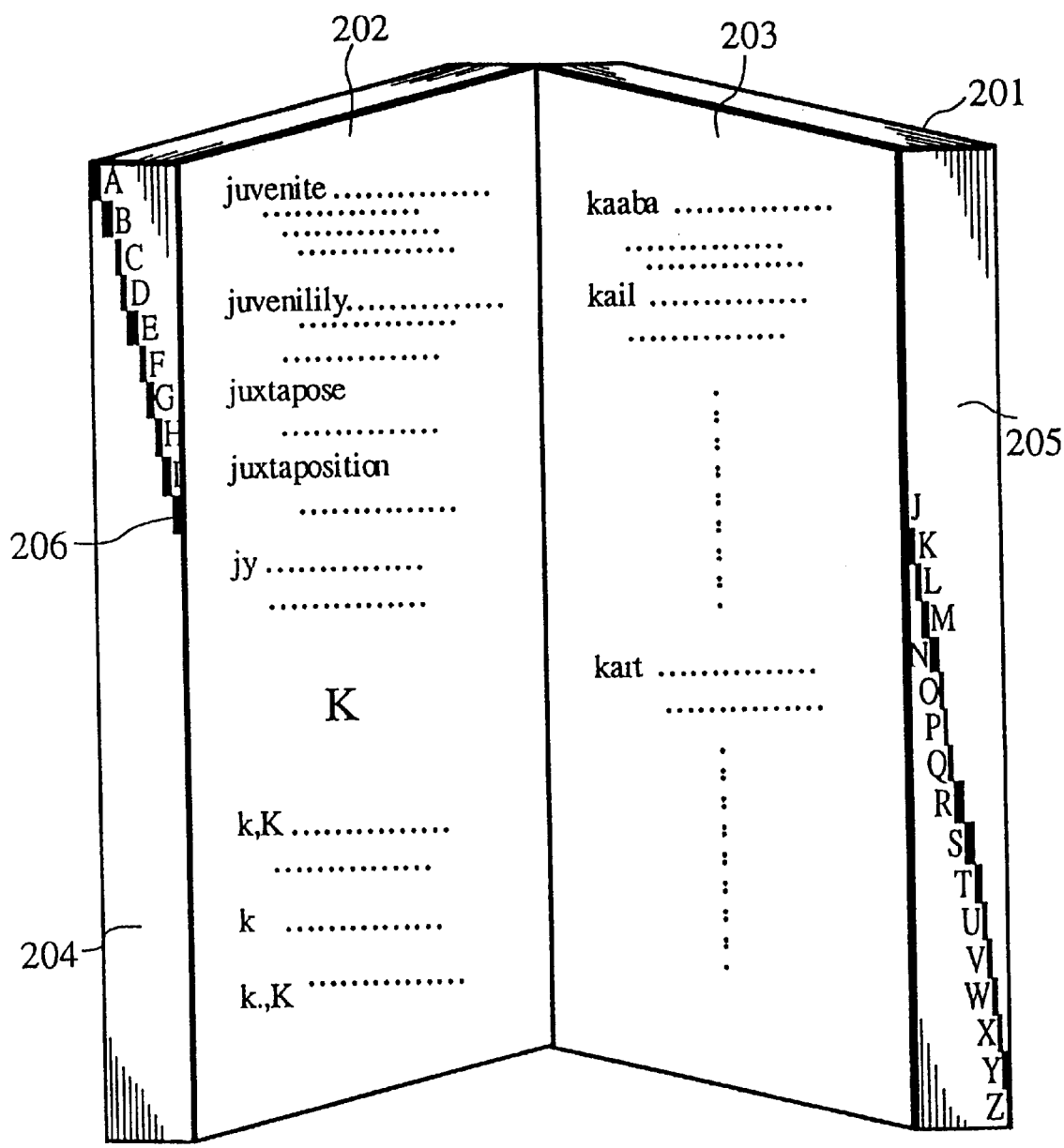
FIG. 20 is a view showing an example of a two-page spread electronic-book of the fifth embodiment.

Whereas in the two-page spread electronic-book, which is shown as relative-location display 201 in FIG. 20, a relative-location of the determined page within the electronic book is displayed. Each index unit 206 is displayed on the fore-edges 204, 205 in the same way as the index units 192; the size of each index unit 206 is also determined in the same way as the index units 192. The thickness of the fore-edge 204 corresponds to the first page to the determined page, while the fore-edge 205 corresponds to the following page to the last page.

The data display control unit 187 displays the two pages' actual data in the relative-location display 201 upon receipt of the data selecting unit 186.

The display unit 189 displays the electronic-book 191 first under the control of the relative-location-display control unit 188, and then displays the relative-location display 201 with the actual data of two pages under the control of the relative-location-display control unit 188 and data display control unit 187.

For example, when the operator designates a point 193 on the electronic-book 191 with the pointing device, the page number determination unit 185 determines with Y1 in the Y coordinate that the initial page of the index K must be opened.

Thus, the display unit 189 displays the initial page of the index K, page 202, in verso and a following page 203 in recto.

Figure 21:
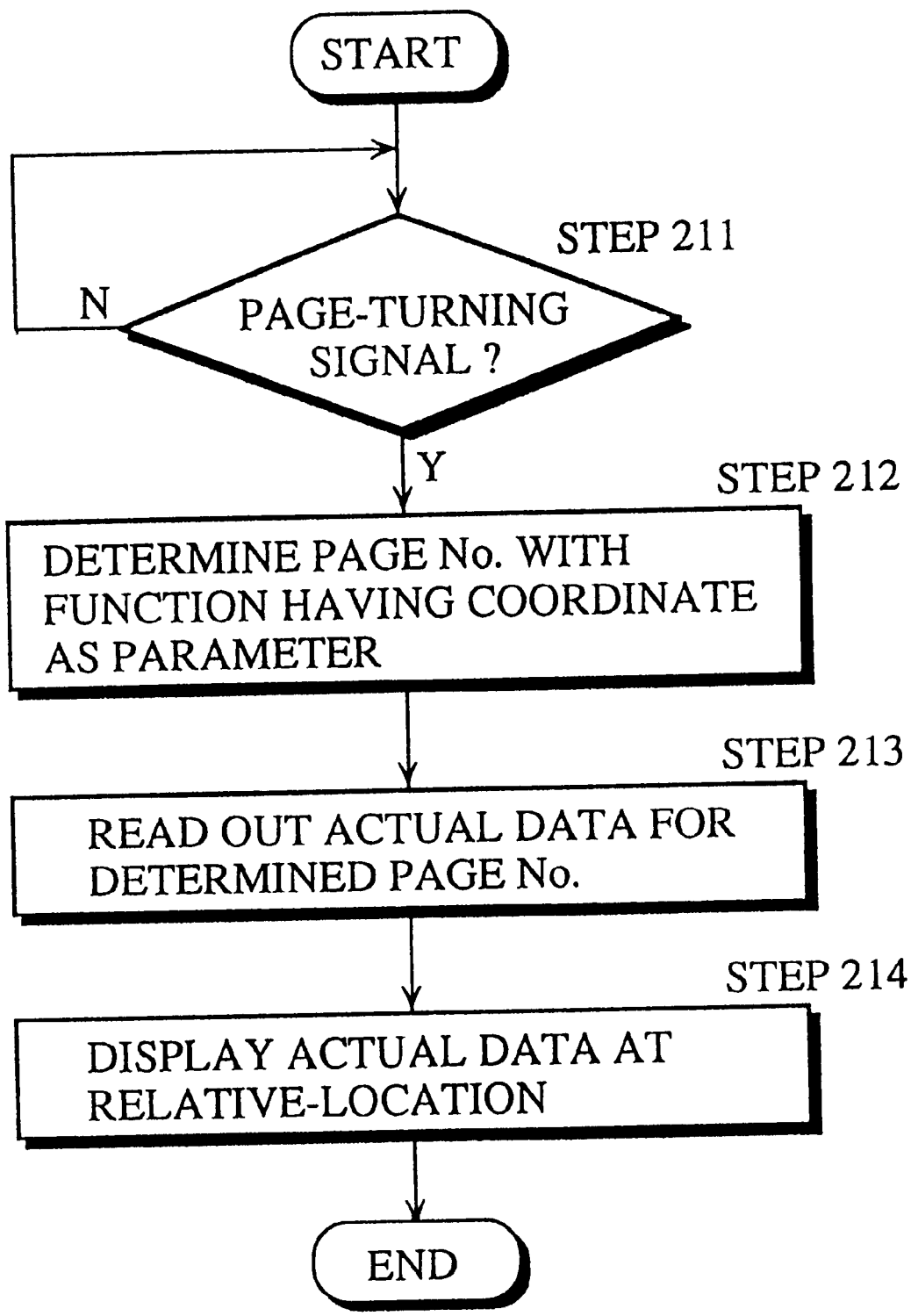
FIG. 21 is a flowchart detailing a page-opening operation in the fifth embodiment.

Next, the operation of the above-described apparatus will be described with reference to the flowchart in FIG. 21.

The operator inputs a page-opening instruction, or designating one of the index units 192 with the pointing device, using the electronic-book 191 displayed on the display unit 189 (Step 211). Then, the page-number determination unit 185 receives the coordinate contained in the input signal read by the input signal reading unit 181, and determines the page number to be opened with the function that uses the designated index 192's coordinate as the parameter (Step 212). Accordingly, the data selection unit 186 reads out the actual data of the determined and following pages from the data storage unit 182 and sends the same to the data display control unit 187 (Step 213).

Consequently, the display unit 189 displays the actual data of pages 202, 203 in the relative-location display 201 (Step 214).

As has been stated, the indexed electronic-book can be opened by designating one of the indexes; a page to be opened is determined with the function and the coordinate of the designated point.

The initial and following pages are opened under the control of the data display control unit 187 in this embodiment; however, the pages may be automatically turned. In this case, the input signal reading unit 181 sends a page turning signal to the page-number determination unit 185, so that it increments the page number by two and sends the same to the data selection unit 186. Thus, the data selection unit 186 reads out the addresses for the sequential page numbers, and hence the actual data of these pages are sent to the data display control unit 187 in succession. Once the operator sees a desired page, he inputs a page-turning suspension instruction into the input signal reading unit 181.

The indexes may be aligned more than one line; yet the page can be opened using the function and the coordinate of the designated point in the same way as above.

The Y coordinate is used in this embodiment; however, an X coordinate may be used instead. For example, an index E is opened with the X coordinate when the point 193 is designated.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A page-retrieval apparatus using an electronic-book display comprising:

means for displaying an index to each group on a fore-edge of a closed electronic-book, the groups collectively forming a document;

means for storing a total page number of the document and a total number of the groups as well as a total page number contained in each group;

means for designating a point in the fore-edge;

means for detecting an index by performing a calculation with a function by substituting a coordinate value of the designated point into the function as a parameter, and detecting a page number of a first page in the detected index;

means for storing contents of the document;

means for storing page numbers in relation with their respective addresses in the document storage means, a content of each page number being stored in their respective addresses;

means for reading two addresses respectively corresponding to the detected page and a following page from the page number storing means and selecting a content of the detected page and a content of the following page from the document content storage means at areas specified by the read two addresses; and means for controlling the display means to end the index display when the address reading and content selecting means has selected the contents of the two pages, and subsequently displaying the selected contents in a two-page spread electronic-book with a first page including the content of the detected page and a second page including the content of the following page, wherein the control means determines a size of each index by dividing a height of the fore-edge by the total number of the groups, and by dividing a width of the fore-edge by a ratio of the total page number of each group to the total page number of the document.

2. The page-retrieval apparatus using an electronic-book display of claim 1, wherein the indexes are alphabet characters arranged in the order.

* * * * *